(12) United States Patent
Wang et al.

(10) Patent No.: US 10,267,658 B2
(45) Date of Patent: Apr. 23, 2019

(54) ENCODER

(71) Applicant: FANUC CORPORATION, Yamanashi (JP)

(72) Inventors: Miaomiao Wang, Yamanashi (JP); Nobuyuki Ootake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/940,506

(22) Filed: Mar. 29, 2018

(65) Prior Publication Data

US 2018/0306607 A1    Oct. 25, 2018

(30) Foreign Application Priority Data

Apr. 20, 2017    (JP) .................................. 2017-083662

(51) Int. Cl.
| G01D 5/347 | (2006.01) |
| H05K 5/02 | (2006.01) |
| G01D 11/24 | (2006.01) |
| G01D 5/244 | (2006.01) |
| H02K 11/21 | (2016.01) |

(52) U.S. Cl.
CPC ....... *G01D 5/3473* (2013.01); *G01D 5/24433* (2013.01); *G01D 11/245* (2013.01); *H02K 11/21* (2016.01); *H05K 5/0213* (2013.01)

(58) Field of Classification Search
CPC ............. G01D 5/3473; G01D 5/24433; G01D 11/245; H02K 11/21; H05K 5/0213
See application file for complete search history.

(56) References Cited

U.S. PATENT DOCUMENTS 7,589,317 B2 *    9/2009    Okano ............... G01D 5/34715
                                                        250/231.13
7,939,796 B2 *    5/2011    Satone ................. G01D 11/245
                                                        250/231.13

FOREIGN PATENT DOCUMENTS

| JP | H10-62113 A | 3/1998 |
| JP | 2003-156650 A | 5/2003 |
| JP | 3435065 B2 | 8/2003 |
| JP | 2005-148035 A | 6/2005 |
| JP | 2005-338764 A | 12/2005 |
| JP | 2016-8953 A | 1/2016 |
| JP | 2017-015521 A | 1/2017 |

OTHER PUBLICATIONS

An Office Action; "Notice of Reasons for Rejection," issued by the Japanese Patent Office dated Jun. 12, 2018, which corresponds to Japanese Patent Application No. 2017-083662 and is related to U.S. Appl. No. 15/940,506.
An Office Action issued by the China National Intellectual Property Administration dated Jan. 30, 2019, which corresponds to Chinese Patent Application No. 201810344022.8 and is related to U.S. Appl. No. 15/940,506.

* cited by examiner

*Primary Examiner* — Seung C Sohn
(74) *Attorney, Agent, or Firm* — Studebaker & Brackett PC

(57) ABSTRACT

An encoder includes: a base member; a printed board fixed directly or indirectly to the base member; and a cover member fixed to the base member while the printed board is arranged inside the cover member. A first enclosed space and a second enclosed space are formed inside the cover member. The first enclosed space is space in which the printed board is arranged entirely or partially in an enclosed state. The second enclosed space is formed between the first enclosed space and the cover member.

8 Claims, 7 Drawing Sheets

ENCODER

This application is based on and claims the benefit of priority from Japanese Patent Application No. 2017-083662, filed on Apr. 20, 2017, the content of which is incorporated herein by reference.

BACKGROUND OF THE INVENTION

Field of the Invention

The present invention relates to an encoder including a base member, a printed board, and a cover member fixed to the base member while the printed board is arranged inside the cover member.

Related Art

An encoder conventionally known includes a base member, a printed board, and a cover member fixed to the base member while the printed board is arranged inside the cover member. In such an encoder, dew may be formed inside the encoder due to a temperature difference between the temperature of air inside the encoder and that of outside air or entry of water into the encoder.

Many electronic parts are used in the encoder. Adhesion of water to the electronic parts due to dew formation may cause electrical short or electric corrosion and this may cause a failure. Hence, it has been required to take some measures against the occurrence of dew inside the encoder. Providing a moisture absorbent inside the encoder has been known as a technique responsive to the occurrence of dew inside the encoder (see Patent Document 1, for example).

Patent Document 1: Japanese Unexamined Patent Application, Publication No. 2017-15521

SUMMARY OF THE INVENTION

However, the technique of providing a moisture absorbent inside the encoder described in Patent Document 1 causes the problem of increase in cost for the encoder.

The present invention is intended to provide an encoder capable of reducing the occurrence of dew inside the encoder at low cost.

(1) The present invention relates to an encoder (rotary encoder 1, 1A, 1B, 1C, 1D, 1E, 1F described later, for example) comprising: a base member (base member 10 described later, for example); a printed board (printed board 34 described later, for example) fixed directly or indirectly to the base member; and a cover member (cover member 20, 20A described later, for example) fixed to the base member while the printed board is arranged inside the cover member. A first enclosed space (first enclosed space M1 described later, for example) and a second enclosed space (second enclosed space M2 described later, for example) are formed inside the cover member. The first enclosed space is space in which the printed board is arranged entirely or partially in an enclosed state. The second enclosed space is formed between the first enclosed space and the cover member.

(2) In the encoder described in (1), the second enclosed space may be formed using the cover member and an enclosure member (enclosure partition member 5, 5A, 5B, 5C, 5D, 5E, 5F described later, for example) attached to the inside of the cover member.

(3) In the encoder described in (2), the enclosure member may include an elastic body.

(4) In the encoder described in (2), the enclosure member may include a member that causes ultraviolet rays to pass through.

(5) In the encoder described in (2), the enclosure member may include a member that causes infrared rays to pass through.

(6) In the encoder described in (2), the enclosure member and the cover member may include a thermoplastic resin.

(7) In the encoder described in (2), the enclosure member may be a member that generates a reduced pressure state between the enclosure member and the cover member.

(8) In the encoder described in any one of (1) to (7), the second enclosed space may be enclosed with gas having higher heat-insulating effect than air.

The encoder provided by the present invention is capable of reducing the occurrence of dew inside the encoder at low cost.

DETAILED DESCRIPTION OF THE INVENTION

Figure 1:
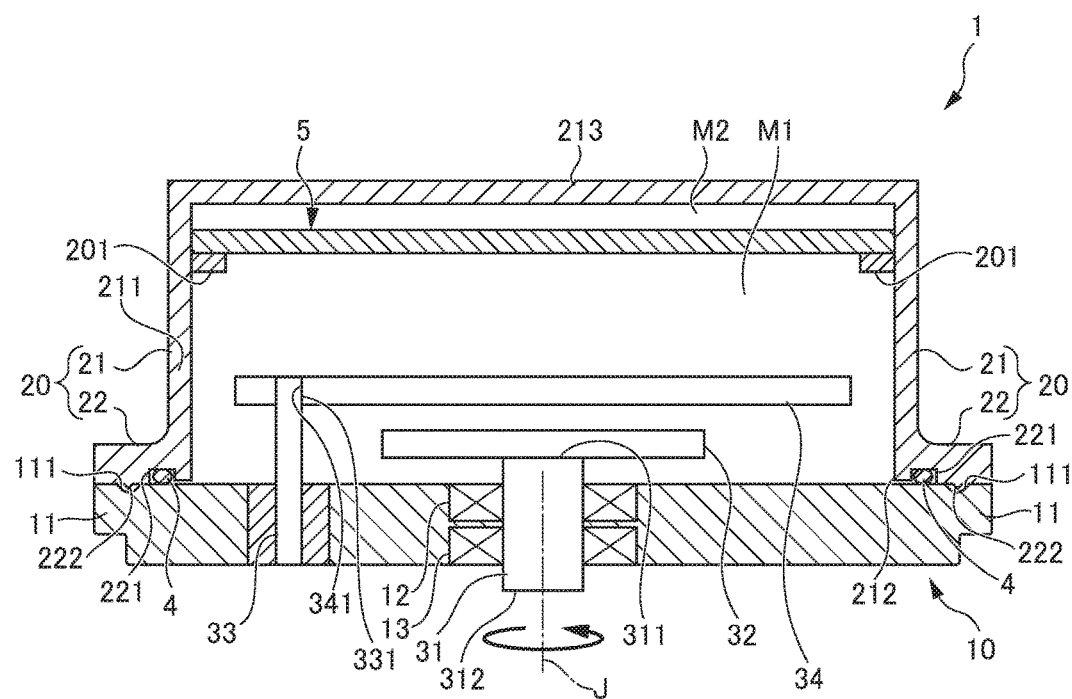
FIG. 1 is a sectional view showing a rotary encoder according to a first embodiment of the present invention.

Embodiments of the present invention will be described below by referring to the drawings. In a second embodiment and subsequent embodiments, structures common to those of the first embodiment will be identified by the same signs and will not be described.

First Embodiment

The following describes a rotary encoder 1 as an encoder according to the first embodiment. FIG. 1 is a sectional view showing the rotary encoder 1 according to the first embodiment of the present invention. In the description of this embodiment, a vertical direction determined in a state where a rotary axis member 31 of the rotary encoder 1 is arranged to extend in the vertical direction (see FIG. 1) is called an "upward and downward direction." A horizontal direction determined in this state is called a "horizontal direction." A side viewed in the upward and downward direction where a cover member 20 is arranged is called an "upper side." A side viewed in the upward and downward direction where a base member 10 is arranged is called a "lower side."

As shown in FIG. 1, the rotary encoder 1 includes the base member 10, the cover member 20, the rotary axis member 31, a rotary slit plate 32, a connector 33, a printed board 34, and an enclosure partition member 5 as an enclosure member. The rotary encoder 1 detects rotation (rotation speed and position) of a rotary body (not shown in the drawings). An example of the rotary body may be a motor such as a servo motor.

The base member 10 has a thickness and is formed into a circular plate shape parallel to the horizontal direction. The base member 10 includes a base side flange 11 protruding outwardly in the horizontal direction. The base side flange 11 is arranged to face a cover side flange 22 of the cover member 20 described later. The base side flange 11 includes a positioning recess 111 formed at a surface of the base side flange 11 adjacent to the cover member 20. The positioning recess 111 is a recess in which a positioning protrusion 222 of the cover member 20 described later is fitted. The rotary axis member 31 is attached to the center of the base member 10 in the radial direction through bearings 12 and 13.

The rotary axis member 31 extends in the upward and downward direction while being supported by the bearings 12 and 13. The rotary axis member 31 is configured to be rotatable about a rotary axis J. The rotary axis member 31 has an upper end 311 to which the rotary slit plate 32 is connected. The rotary axis member 31 has a lower end 312 to which a rotary axis (not shown in the drawings) of a motor (not shown in the drawings) is coupled.

The cover member 20 includes a cover member body 21 and the cover side flange 22. The cover member body 21 includes: a cylindrical peripheral wall part 211 extending in the direction of the rotary axis J of the rotary axis member 31 with respect to the rotary axis member 31 as a center; an opening part 212 formed on one side of a direction in which the rotary axis member 31 extends; and a closing part 213 formed on the opposite side of the direction in which the rotary axis member 31 extends. The opening part 212 of the cover member body 21 is closed by the base member 10. A first enclosed space M1 and a second enclosed space M2 are formed through the enclosure partition member 5 inside the cover member body 21 described later.

The cover side flange 22 is formed to extend from the periphery of the opening part 212 of the cover member body 21 outwardly in the horizontal direction. A surface of the cover side flange 22 adjacent to the base member 10 is arranged to abut on the surface of the base side flange 11 adjacent to the cover member 20.

An O-ring housing groove 221 and the positioning protrusion 222 are formed at the surface of the cover side flange 22 adjacent to the base member 10. The positioning protrusion 222 is fitted in the positioning recess 111 at the base side flange 11 of the base member 10. In this way, the positioning protrusion 222 is used for determining the position of the cover member 20 in the radial direction when the cover member 20 is attached to the base member 10.

The O-ring housing groove 221 is formed to extend across the entire peripheral direction of the cover side flange 22. The O-ring housing groove 221 houses an O-ring 4. The O-ring 4 abuts on the surface of the base side flange 11 adjacent to the cover member 20 at a position adjacent to the outer edge of the base member 10 while being housed in the O-ring housing groove 221. The O-ring 4 forms a seal between the base member 10 and the cover member 20 at the periphery of the opening part 212 of the cover member 20. In this way, water tightness between the base member 10 and the cover member 20 is ensured.

As shown in FIG. 1, the printed board 34 and the rotary slit plate 32 are arranged inside the cover member body 21.

The rotary slit plate 32 is formed into a circular plate shape extending in the radial direction of the cover member 20. The upper end 311 of the rotary axis member 31 is connected to the center of the rotary slit plate 32. The rotary slit plate 32 rotates in response to rotation of the rotary axis member 31. The rotary slit plate 32 has a slit (not shown in the drawings) to be detected by a sensor detection unit (not shown in the drawings) arranged at the printed board 34.

The connector 33 is provided at a position separated by a predetermined distance in the radial direction from the rotary axis J of the base member 10 to extend parallel to the axis direction of the rotary axis member 31 (direction in which the rotary axis member 31 extends) while protruding toward the cover member 20.

The connector 33 has a tip where a connector contact 331 is formed. The connector contact 331 is provided at a position separated by a predetermined distance in the radial direction from the rotary axis J of the base member 10 and contacts a board side contact part 341 of the printed board 34. In this way, the connector 33 is electrically connected to the printed board 34.

The printed board 34 is arranged inside the cover member 20. The printed board 34 is fixed directly or indirectly to the base member 10. The cover member 20 is fixed to the base member 10 while the printed board 34 is arranged inside the cover member 20. The printed board 34 is provided adjacent to a surface of the rotary slit plate 32 opposite a surface thereof to which the rotary axis member 31 is connected to be parallel to the rotary slit plate 32 and separated from the rotary slit plate 32. The printed board 34 is fixed to the base member 10 while being supported by a printed board support (not shown in the drawings) standing upright from the upper surface of the base member 10, for example.

The printed board 34 is formed into a plate shape extending in the radial direction of the cover member 20. An electronic part (not shown in the drawings) such as the sensor detection unit (not shown in the drawings) is mounted on the printed board 34. The printed board 34 includes the board side contact part 341. The connector contact 331 of the connector 33 is electrically connected to the board side contact part 341. The board side contact part 341 is a terminal for input and output of a sensor signal detected by the sensor detection unit (not shown in the drawings) and other electrical signals.

The enclosure partition member 5 is attached to the inside of the cover member 20. The enclosure partition member 5 is a member for partitioning the internal space of the cover member body 21 into the upper first enclosed space M1 and the lower second enclosed space M2. The printed board 34 is arranged in an enclosed state in the first enclosed space M1. The second enclosed space M2 is formed between the first enclosed space M1 and the cover member body 21. In other words, the second enclosed space M2 is formed between outside air above the upper surface (external surface) of the closing part 213 having a large externally exposed area and the first enclosed space M1. The second enclosed space M2 is formed by being surrounded by the cover member 20 and the enclosure partition member 5.

In this embodiment, the enclosure partition member 5 is formed into a plate shape extending in the horizontal direction and formed at an intermediate position viewed in the upward and downward direction of the peripheral wall part 211 of the cover member body 21 of the cover member 20 into a size for blocking the opening of the peripheral wall part 211. The enclosure partition member 5 inside the cover member body 21 is arranged above the printed board 34 while being separated from the lower surface of the closing part 213 of the cover member body 21 of the cover member 20. In this way, the enclosure partition member 5 partitions the internal space of the cover member body 21 into upper space and lower space.

The peripheral part of the enclosure partition member 5 is supported on a support protrusion 201 protruding inwardly in the radial direction from the inner surface of the peripheral wall part 211 of the cover member body 21. The support protrusion 201 may be configured to be integral with or separated from the peripheral wall part 211.

In this embodiment, the enclosure partition member 5 includes an elastically-deformable elastic body and is formed into a circular plate shape. The enclosure partition member 5 is formed to have an area larger than the opening area of the peripheral wall part 211. Thus, in this embodiment, the enclosure partition member 5 is attached to the inside of the cover member body 21 by inserting the enclosure partition member 5 in a bent state into the cover member body 21, moving the enclosure partition member 5 to a position above the support protrusion 201 on the peripheral wall part 211 of the cover member body 21, and then expanding the enclosure partition member 5.

As a result, the peripheral part of the enclosure partition member 5 is pressed against the inner surface of the peripheral wall part 211 of the cover member body 21 by the elastic force of the enclosure partition member 5, so that the enclosure partition member 5 can be attached to the inside of the peripheral wall part 211 of the cover member body 21 with increased enclosure performance while being supported on the support protrusion 201. The peripheral part of the enclosure partition member 5 is supported on the support protrusion 201. This allows the enclosure partition member 5 to apply elastic force properly and stably to the inner surface of the peripheral wall part 211 of the cover member body 21. This further facilitates the attachment of the enclosure partition member 5 to the cover member 20. A member for supporting the peripheral part of the enclosure partition member 5 is not limited to the support protrusion 201 but may be realized by a groove, for example.

In this way, the enclosure partition member 5 partitions the internal space of the cover member body 21 into the upper space and the lower space. As a result, the first enclosed space M1 can be formed in the upper space of the internal space of the cover member body 21. Further, the second enclosed space M2 can be formed in the lower space of the internal space of the cover member body 21.

In this embodiment, the enclosure partition member 5 includes an elastic body. However, this is not the only case. The enclosure partition member 5 may include a member not to be deformed elastically. In this case, the enclosure partition member 5 may be placed inside the cover member body 21, and then the enclosure partition member 5 may be fixed to the cover member body 21 using a support member for supporting the enclosure partition member 5, for example. A sealing member (not shown in the drawings) may be provided between the enclosure partition member 5 and the inner surface of the peripheral wall part 211 of the cover member body 21 to increase enclosure performance.

The rotary encoder 1 of the first embodiment having the foregoing configuration achieves the following effects. The rotary encoder 1 of this embodiment includes: the base member 10; the printed board 34 fixed directly or indirectly to the base member 10; and the cover member 20 fixed to the base member 10 while the printed board 34 is arranged inside the cover member 20. The first enclosed space M1 and the second enclosed space M2 are formed inside the cover member 20. The first enclosed space M1 is space in which the printed board 34 is arranged in an enclosed state. The second enclosed space M2 is formed between the first enclosed space M1 and the cover member 20.

In this structure, outside air above the upper surface (external surface) of the closing part 213 having a large externally exposed area and the first enclosed space M1 in which the printed board 34 is arranged contact each other through the second enclosed space M2. Thus, dew is unlikely to occur in the first enclosed space M1. As a result, the occurrence of dew can be reduced in the first enclosed space M1 at low cost. This makes it possible to reduce the occurrence of adhesion of water droplets to the printed board 34 arranged inside the first enclosed space M1.

In this embodiment, the second enclosed space M2 is formed using the cover member 20 and the enclosure partition member 5 attached to the inside of the cover member 20. Thus, the first enclosed space M1 and the second enclosed space M2 can be formed by the simple structure of attaching the enclosure partition member 5 to the inside of the cover member 20. As a result, the occurrence of dew in the first enclosed space M1 can be reduced by this simple structure.

In this embodiment, the enclosure partition member 5 includes an elastic body. Thus, elastic force is generated during insertion of the enclosure partition member 5 into the cover member 20, and the enclosure partition member 5 is pressed against the inner surface of the peripheral wall part 211 of the cover member body 21 of the cover member 20 by this elastic force. Thus, the first enclosed space M1 and the second enclosed space M2 can be formed with increased enclosure performance. This makes it possible to further increase the enclosure performance of the second enclosed space M2 to further reduce the occurrence of dew in the first enclosed space M1.

Second Embodiment

Figure 2:
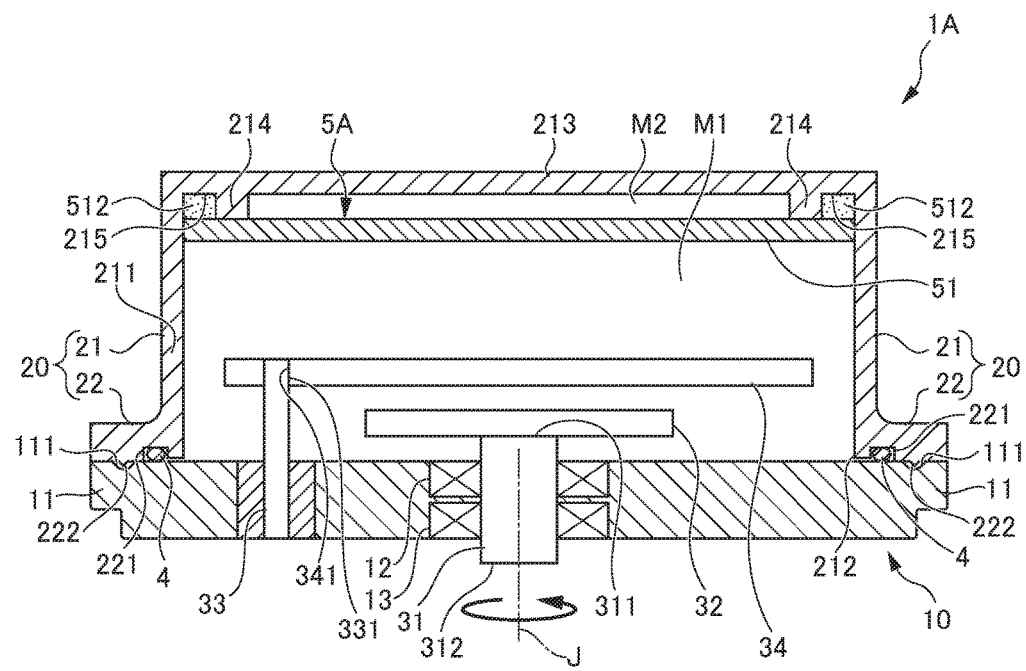
FIG. 2 is a sectional view showing a rotary encoder according to a second embodiment of the present invention.

The following describes a rotary encoder 1A according to a second embodiment. FIG. 2 is a sectional view showing the rotary encoder 1A according to the second embodiment of the present invention. A main difference of the rotary encoder 1A of the second embodiment lies in the configuration of an enclosure partition member 5A differing from that of the enclosure partition member 5 of the first embodiment. In the second embodiment, structures comparable to those of the first embodiment will not be described.

The enclosure partition member 5A of the second embodiment includes a transmitting member that causes particular rays to pass through. Examples of the particular rays include ultraviolet rays and infrared rays. For example, the enclosure partition member 5A includes a member that causes ultraviolet rays to pass through. For example, a material such as an acrylic material having a relatively high transmittance of ultraviolet rays is usable as the transmitting member that causes ultraviolet rays to pass through. The enclosure partition member 5A includes a member that causes infrared rays to pass through. For example, a material such as polyetherimide (PEI) having a relatively high transmittance of infrared rays is usable as the transmitting member that causes infrared rays to pass through.

As shown in FIG. 2, in the second embodiment, an annular protrusion 214 formed into an annular shape is provided to the lower surface of the closing part 213 of the cover member body 21 of the cover member 20. The annular protrusion 214 is provided at a position inside the periphery of the closing part 213 in the radial direction and protrudes downwardly from the lower surface of the closing part 213 while extending in an annular shape. The upper surface of the enclosure partition member 5A abuts on the lower surface of the annular protrusion 214. Thus, the second enclosed space M2 covering a range corresponding to the height of the annular protrusion 214 is formed inside the annular protrusion 214 in the radial direction and between the lower surface of the closing part 213 and the upper surface of the enclosure partition member 5A. An annular adhesive placement groove 215 is formed outside the annular protrusion 214 of the cover member body 21 in the radial direction. The adhesive placement groove 215 is a groove in which an adhesive 512 to be cured by particular rays (ultraviolet rays or infrared rays) can be placed.

If the enclosure partition member 5A includes an ultraviolet transmitting member, for example, an ultraviolet curable adhesive to be cured by application of ultraviolet rays from below the enclosure partition member 5A is usable as the adhesive 512. If the enclosure partition member 5A includes the ultraviolet transmitting member, the enclosure partition member 5A is attached to the cover member 20 while the ultraviolet curable adhesive in a liquid form is placed in the adhesive placement groove 215. Then, ultraviolet rays are applied from below the enclosure partition member 5A to cure the ultraviolet curable adhesive, thereby fixing the enclosure partition member 5A to the cover member 20. In this way, the second enclosed space M2 can be formed easily.

If the enclosure partition member 5A includes an infrared transmitting member, a thermosetting adhesive to be cured with the heat energy of infrared rays generated by application of the infrared rays from below the enclosure partition member 5A is usable as the adhesive 512. If the enclosure partition member 5A includes the infrared transmitting member, the enclosure partition member 5A is attached to the cover member 20 while the thermosetting adhesive in a liquid form is placed in the adhesive placement groove 215. Then, infrared rays are applied from below the enclosure partition member 5A to cure the thermosetting adhesive with the heat energy of the infrared rays, thereby fixing the enclosure partition member 5A to the cover member 20. In this way, the second enclosed space M2 can be formed easily. Instead of placing the thermosetting adhesive in the adhesive placement groove 215 and curing the thermosetting adhesive, thermosetting elastomer tape may be placed and cured, for example.

In the rotary encoder 1A including the enclosure partition member 5A of the second embodiment, the enclosure partition member 5A includes a member that causes particular rays (ultraviolet rays or infrared rays) to pass through. Thus, the enclosure partition member 5A can easily be attached to the cover member 20 using an adhesive to be cured by the particular ray.

Third Embodiment

Figure 3:
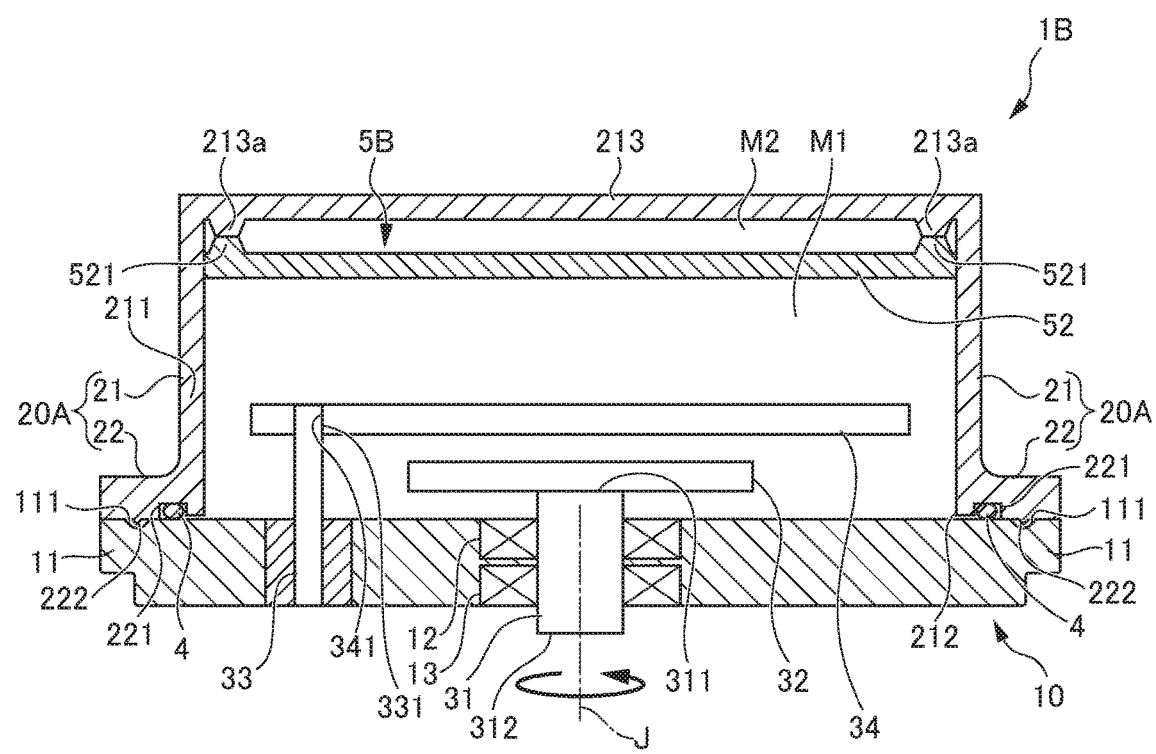
FIG. 3 is a sectional view showing a rotary encoder according to a third embodiment of the present invention.

The following describes a rotary encoder 1B according to a third embodiment. FIG. 3 is a sectional view showing the rotary encoder 1B according to the third embodiment of the present invention. Main differences of the rotary encoder 1B of the third embodiment lie in the configuration of a cover member 20A and that of an enclosure partition member 5B differing from the configuration of the cover member 20 and that of the enclosure partition member 5 of the first embodiment, respectively. In the third embodiment, structures comparable to those of the first embodiment will not be described.

In the third embodiment, the cover member 20A and the enclosure partition member 5B include a thermoplastic resin.

As shown in FIG. 3, the cover member 20A includes a cover member side annular protrusion 213a. The cover member side annular protrusion 213a is provided at the periphery of the lower surface of the closing part 213 of the cover member body 21 and protrudes downwardly in an annular shape.

The enclosure partition member 5B includes a partition member side annular protrusion 521. The partition member side annular protrusion 521 is provided at the periphery of the upper surface of the enclosure partition member 5B and protrudes upwardly in an annular shape. The partition member side annular protrusion 521 is arranged to face the cover member side annular protrusion 213a.

For attachment of the enclosure partition member 5B to the cover member 20A, while the partition member side annular protrusion 521 of the enclosure partition member 5B is butted to the cover member side annular protrusion 213a of the cover member 20A, the respective contact parts of the partition member side annular protrusion 521 and the cover member side annular protrusion 213a are welded by an ultrasonic welding machine, thereby fixing the enclosure partition member 5B to the cover member 20A. By doing so, by the presence of the cover member side annular protrusion 213a of the cover member 20A and the partition member side annular protrusion 521 of the enclosure partition member 5B, the second enclosed space M2 is formed between the lower surface of the closing part 213 of the cover member 20A and the upper surface of the enclosure partition member 5B in the height direction. In this way, the second enclosed space M2 can be formed easily.

In the rotary encoder 1B including the enclosure partition member 5B of the third embodiment, the cover member 20A and the enclosure partition member 5B include a thermoplastic resin. Thus, the enclosure partition member 5B can easily be attached to the cover member 20A by thermal welding.

In the third embodiment, the cover member side annular protrusion 213a is provided at the lower surface of the closing part 213 of the cover member body 21 of the cover member 20A and the partition member side annular protrusion 521 is provided at the upper surface of the enclosure partition member 5B. However, this is not the only case. For example, only one of the cover member side annular protrusion 213a at the closing part 213 of the cover member body 21 of the cover member 20A and the partition member side annular protrusion 521 of the enclosure partition member 5B may be provided for welding the enclosure partition member 5B and the cover member 20A by ultrasonic welding.

Alternatively, both the cover member side annular protrusion 213a at the cover member 20A and the partition member side annular protrusion 521 at the enclosure partition member 5B may be omitted, for example. For example, an annular reinforcing member (not shown in the drawings) having a thickness and including a thermoplastic resin may be provided between the lower surface of the periphery of the cover member 20A and the upper surface of the periphery of the enclosure partition member 5B. Then, the enclosure partition member 5B, the cover member 20A, and the reinforcing member may be welded by ultrasonic welding.

Fourth Embodiment

Figure 4:
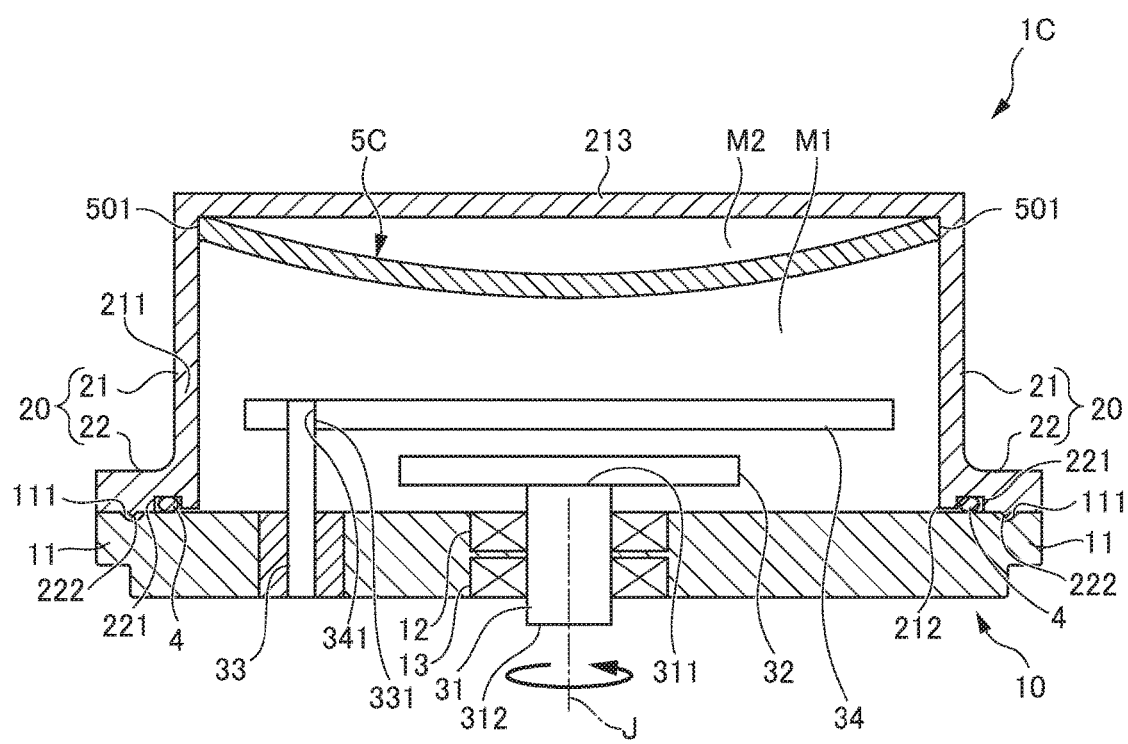
FIG. 4 is a sectional view showing a rotary encoder according to a fourth embodiment of the present invention.

The following describes a rotary encoder 1C according to a fourth embodiment. FIG. 4 is a sectional view showing the rotary encoder 1C according to the fourth embodiment of the present invention. A main difference of the rotary encoder 1C of the fourth embodiment lies in the configuration of an enclosure partition member 5C differing from that of the enclosure partition member 5 of the first embodiment. In the fourth embodiment, structures comparable to those of the first embodiment will not be described.

The enclosure partition member 5C of the fourth embodiment is configured as a sucker. The enclosure partition member 5C is a member that generates a reduced pressure state between the enclosure partition member 5C and the cover member 20. In this embodiment, the enclosure partition member 5C is formed into a plate shape with a center bent and curved downwardly and includes a soft and elastic material, for example. The enclosure partition member 5C is arranged in such a manner that, while the enclosure partition member 5C is bent and curved downwardly at the center, end surfaces 501 pointing in the horizontal direction at the opposite ends of the enclosure partition member 5C abut on the inner surface of the upper end of the peripheral wall part 211 of the cover member body 21 of the cover member 20.

The second enclosed space M2 is formed between the lower surface of the closing part 213 of the cover member 20 and the upper surface of the enclosure partition member 5C. The first enclosed space M1 is formed between the lower surface of the enclosure partition member 5C, the inner surface of the peripheral wall part 211 of the cover member 20, and the upper surface of the base member 10. The second enclosed space M2 is placed in reduced air pressure lower than air pressure outside the cover member 20 or air pressure in the first enclosed space M1. In this way, the enclosure partition member 5C generates a reduced pressure state in the second enclosed space M2 between the enclosure partition member 5C and the cover member 20.

The following describes how the enclosure partition member 5C is attached to the inside of the cover member 20. In this embodiment, the enclosure partition member 5C is configured as a sucker, formed into a plate shape bent and curved downwardly at the center, and includes a soft and elastic material. Thus, the second enclosed space M2 in a reduced pressure state can be formed by pressing part of the enclosure partition member 5C functioning as a sucker against the inner surface of the cover member 20 so as to generate the reduced pressure state in the second enclosed space M2.

In the rotary encoder 1C including the enclosure partition member 5C of the fourth embodiment, the enclosure partition member 5C is a member that generates a reduced pressure state between the enclosure partition member 5C and the cover member 20. Thus, the enclosure partition member 5C can be fixed to the inner surface of the cover member 20 by simply pressing the enclosure partition member 5C configured as a sucker against the inner surface of the cover member 20. In this way, the enclosure partition member 5C can easily be fixed to the inner surface of the cover member 20 without using an adhesive, for example.

Fifth Embodiment

Figure 5:
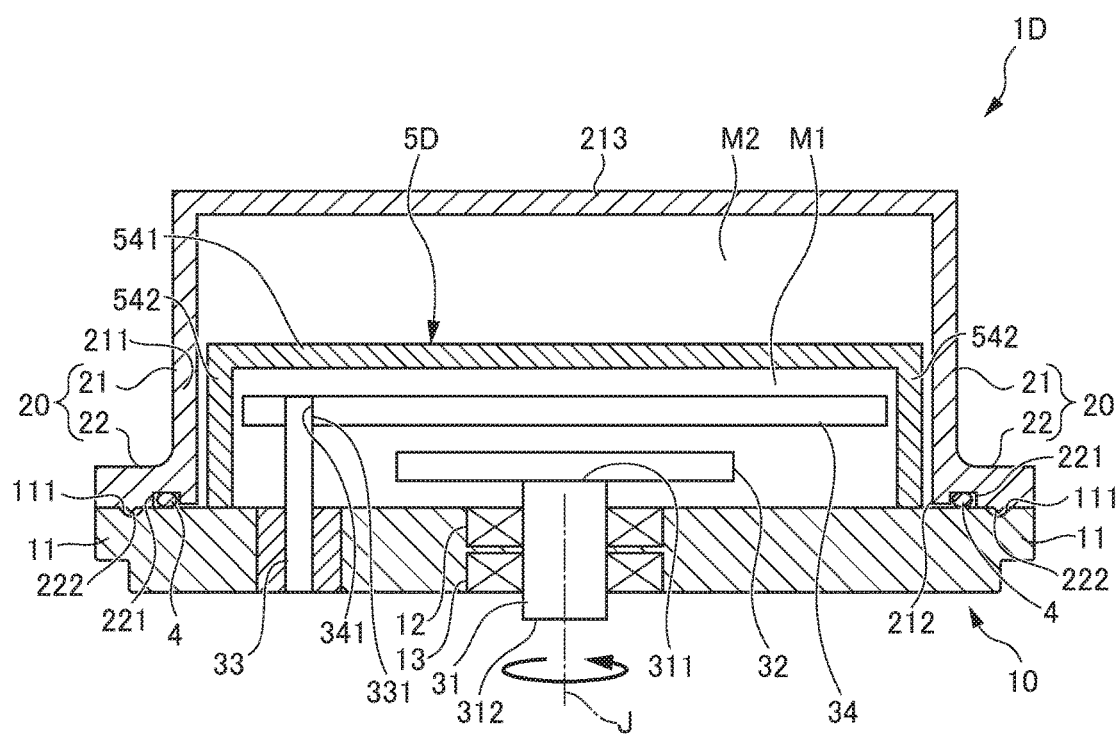
FIG. 5 is a sectional view showing a rotary encoder according to a fifth embodiment of the present invention.

The following describes a rotary encoder 1D according to a fifth embodiment. FIG. 5 is a sectional view showing the rotary encoder 1D according to the fifth embodiment of the present invention. A main difference of the rotary encoder 1D of the fifth embodiment lies in the configuration of an enclosure partition member 5D differing from that of the enclosure partition member 5 of the first embodiment. In the fifth embodiment, structures comparable to those of the first embodiment will not be described.

The enclosure partition member 5D of the fifth embodiment is formed into a cylindrical shape with an open bottom surface. The enclosure partition member 5D includes a top surface part 541 and a cylindrical partition peripheral wall part 542 surrounding the periphery of the printed board 34. The partition peripheral wall part 542 has a lower end attached to the upper surface of the base member 10. The partition peripheral wall part 542 has an upper end located at a position separated from the lower surface of the closing part 213 of the cover member 20 and closed by the top surface part 541. In this way, the first enclosed space M1 is formed between the enclosure partition member 5D and the upper surface of the base member 10. The printed board 34 is arranged in the first enclosed space M1 inside the enclosure partition member 5D. The second enclosed space M2 is formed between the external surface of the enclosure partition member 5D and the inner surface of the cover member 20.

The rotary encoder 1D including the enclosure partition member 5D of the fifth embodiment is capable of achieving effects comparable to those achieved by the first embodiment. Specifically, dew is unlikely to occur inside the enclosure partition member 5D forming the first enclosed space M1. Thus, the occurrence of dew can be reduced in the first enclosed space M1. Further, the first enclosed space M1 and the second enclosed space M2 can be formed by the simple structure of attaching the enclosure partition member 5D to the upper surface of the base member 10. As a result, the occurrence of dew in the first enclosed space M1 can be reduced by this simple structure.

Sixth Embodiment

Figure 6:
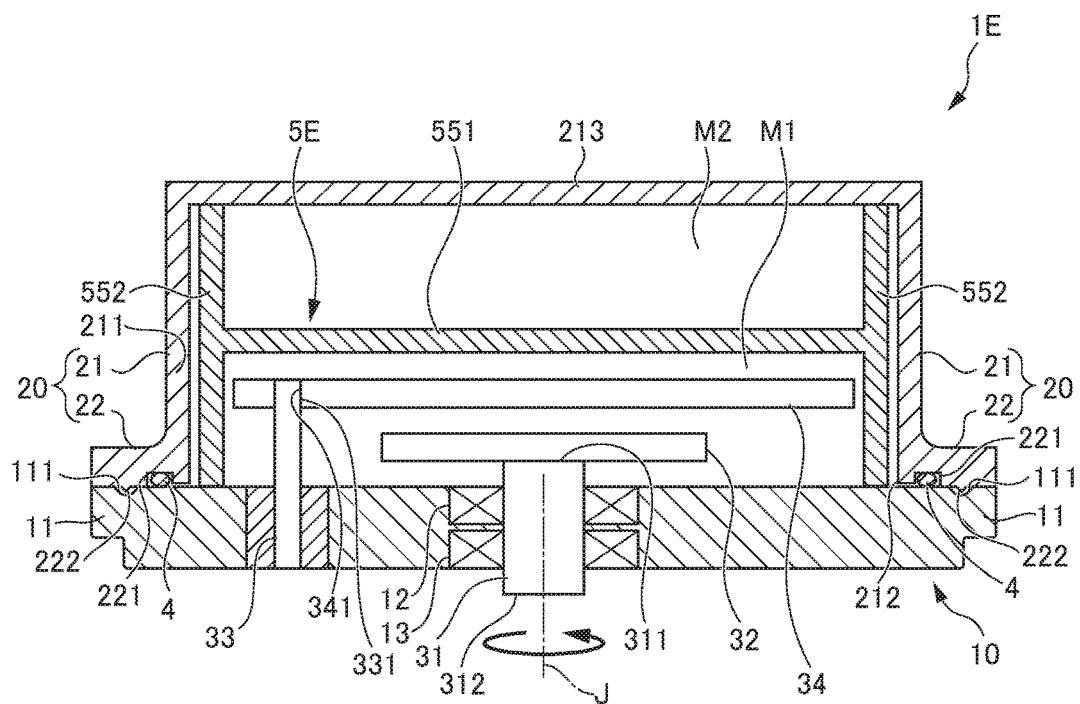
FIG. 6 is a sectional view showing a rotary encoder according to a sixth embodiment of the present invention.

The following describes a rotary encoder 1E according to a sixth embodiment. FIG. 6 is a sectional view showing the rotary encoder 1E according to the sixth embodiment of the present invention. A main difference of the rotary encoder 1E of the sixth embodiment lies in the configuration of an enclosure partition member 5E differing from that of the enclosure partition member 5 of the first embodiment. In the sixth embodiment, structures comparable to those of the first embodiment will not be described.

The enclosure partition member 5E of the sixth embodiment is formed into an H-shape in cross section. The enclosure partition member 5E includes an inner cylindrical wall 552 formed inside the peripheral wall part 211 of the cover member body 21 of the cover member 20, and a partition plate 551 arranged inside the inner cylindrical wall 552 to extend in the radial direction.

The inner cylindrical wall 552 is formed into a cylindrical shape surrounding the periphery of the printed board 34 and extends in the upward and downward direction. The inner cylindrical wall 552 has a lower end arranged to abut on the upper surface of the base member 10, and an upper end arranged to abut on the lower surface of the closing part 213 of the cover member body 21 of the cover member 20.

The partition plate 551 has a plate shape extending in the horizontal direction and is formed inside the inner cylindrical wall 552 and at an intermediate position viewed in the upward and downward direction of the inner cylindrical wall 552 into a size for blocking the opening of the peripheral wall part 211. The partition plate 551 inside the inner cylindrical wall 552 is arranged above the printed board 34 while being separated downwardly from the lower surface of the closing part 213 of the cover member body 21 of the cover member 20. The partition plate 551 partitions the internal space of the inner cylindrical wall 552 into upper space and lower space. The first enclosed space M1 in which the printed board 34 is arranged is formed inside the inner cylindrical wall 552 and below the partition plate 551. The second enclosed space M2 is formed inside the inner cylindrical wall 552 and above the partition plate 551.

The rotary encoder 1E including the enclosure partition member 5E of the sixth embodiment is capable of achieving effects comparable to those achieved by the first embodiment. Specifically, dew is unlikely to occur in the first enclosed space M1. Thus, the occurrence of dew can be reduced in the first enclosed space M1. Further, the first enclosed space M1 and the second enclosed space M2 can be formed by the simple structure of attaching the enclosure partition member 5E between the upper surface of the base member 10 and the cover member 20. As a result, the occurrence of dew in the first enclosed space M1 can be reduced by this simple structure.

Seventh Embodiment

Figure 7:
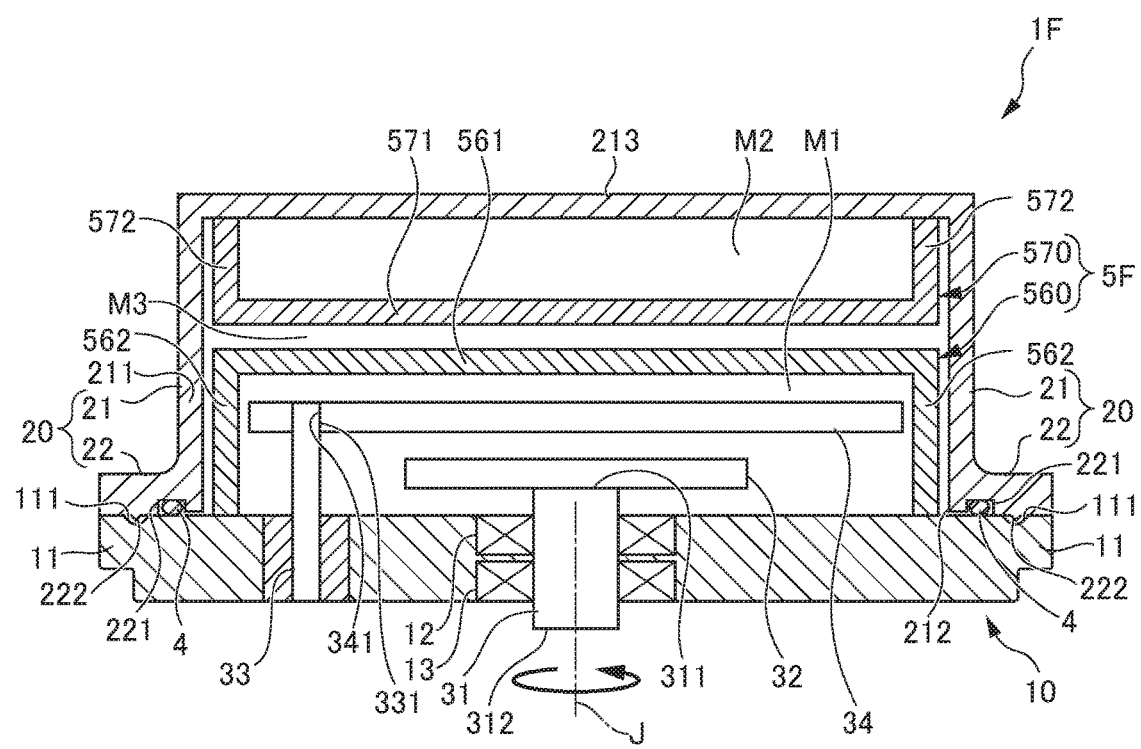
FIG. 7 is a sectional view showing a rotary encoder according to a seventh embodiment of the present invention.

The following describes a rotary encoder 1F according to a seventh embodiment. FIG. 7 is a sectional view showing the rotary encoder 1F according to the seventh embodiment of the present invention. A main difference of the rotary encoder 1F of the seventh embodiment lies in the configuration of an enclosure partition member 5F differing from that of the enclosure partition member 5 of the first embodiment. In the seventh embodiment, structures comparable to those of the first embodiment will not be described.

The enclosure partition member 5F of the seventh embodiment includes a first surrounding member 560 and a second surrounding member 570. The first surrounding member 560 and the second surrounding member 570 are arranged inside the cover member 20 and separated, one above the other. The first surrounding member 560 of the enclosure partition member 5F of the seventh embodiment has the same configuration as the enclosure partition member 5D of the fifth embodiment. The first surrounding member 560 and the second surrounding member 570 of the enclosure partition member 5F of the seventh embodiment correspond to configurations formed by separating the enclosure partition member 5E of the sixth embodiment into an upper configuration and a lower configuration at the partition plate 551.

Similarly to the enclosure partition member 5D of the fifth embodiment (see FIG. 5), the first surrounding member 560 is formed into a cylindrical shape with an open bottom surface. The first surrounding member 560 includes a first surrounding top surface part 561 and a cylindrical first surrounding peripheral wall part 562 surrounding the periphery of the printed board 34. The first surrounding peripheral wall part 562 has a lower end attached to the upper surface of the base member 10. The first surrounding peripheral wall part 562 has an upper end located at a position separated from the lower surface of the closing part 213 of the cover member 20 and closed by the first surrounding top surface part 561. In this way, the first enclosed space M1 is formed between the first surrounding member 560 and the upper surface of the base member 10. The printed board 34 is arranged in the first enclosed space M1 inside the first surrounding member 560.

The second surrounding member 570 is arranged above the first surrounding member 560 to be separated from the first surrounding member 560. The second surrounding member 570 is formed into a cylindrical shape with an open top surface. The second surrounding member 570 includes a second surrounding lower surface part 571, and a cylindrical second surrounding peripheral wall part 572 having the same diameter as the first surrounding peripheral wall part 562. The second surrounding peripheral wall part 572 has an upper end attached to the lower surface of the closing part 213 of the cover member body 21 of the cover member 20. The second surrounding peripheral wall part 572 has a lower end located at a position separated from the upper surface of the first surrounding top surface part 561 of the first surrounding member 560 and closed by the second surrounding lower surface part 571. In this way, the second enclosed space M2 is formed between the second surrounding member 570 and the lower surface of the closing part 213 of the cover member 20. Further, a third enclosed space M3 is formed between the second surrounding member 570 and the first surrounding member 560.

The rotary encoder 1F including the enclosure partition member 5F of the seventh embodiment is capable of achieving effects comparable to those achieved by the first embodiment. Specifically, dew is unlikely to occur inside the first surrounding member 560 of the enclosure partition member 5F forming the first enclosed space M1. Thus, the occurrence of dew can be reduced in the first enclosed space M1. Further, the first enclosed space M1 and the second enclosed space M2 can be formed by the simple structure of attaching the first surrounding member 560 to the upper surface of the base member 10 and attaching the second surrounding member 570 to the lower surface of the closing part 213 of the cover member 20. As a result, the occurrence of dew in the first enclosed space M1 can be reduced by this simple structure.

Additionally, in the seventh embodiment, the presence of the third enclosed space M3 between the second surrounding member 570 and the first surrounding member 560 makes it possible to further reduce the occurrence of dew in the first enclosed space M1.

It should be noted that the present invention is not limited to the foregoing embodiments but modifications or improvements within a range in which the purpose of the present invention is attainable are also included in the present invention. In the foregoing first to seventh embodiments, for example, the second enclosed space M2 is filled with air. However, this is not the only case. For example, the second enclosed space M2 may be enclosed with gas having a higher heat-insulating effect than air by filling the enclosed space M2 with such gas having a higher heat-insulating effect than air. Examples of the gas having a higher heat-insulating effect than air include Ar gas and Kr gas. This achieves a high heat-insulating effect in the second enclosed space M2, so that the occurrence of dew in the first enclosed space M1 can be reduced further. The second enclosed space M2 can be filled with Ar gas or Kr gas, for example, by attaching each of the enclosure partition members 5 to 5F to the cover member 20 in an atmosphere of Ar gas or Kr gas, for example.

In the foregoing embodiments, the first enclosed space M1 is configured in such a manner that the printed board 34 is arranged entirely in an enclosed state in the first enclosed space M1. However, this is not the only case but the first enclosed space M1 may be configured in such a manner that the printed board 34 is arranged partially in the first enclosed space M1.

EXPLANATION OF REFERENCE NUMERALS 1, 1A, 1B, 1C, 1D, 1E, 1F Rotary encoder (encoder)
5, 5A, 5B, 5C, 5D, 5E, 5F Enclosure partition member (enclosure member)

10 Base member
20, 20A Cover member
34 Printed board
M1 First enclosed space
M2 Second enclosed space

What is claimed is:

1. An encoder comprising:
a base member;
a printed board fixed directly or indirectly to the base member; and
a cover member fixed to the base member while the printed board is arranged inside the cover member, wherein
the cover member is formed into a cylindrical shape, and includes an opening part formed on one side and a closing part formed on an opposite side,
the base member is arranged on the opening part side of the cover member,
a first enclosed space and a second enclosed space are formed inside the cover member, the first enclosed space being space in which the printed board is arranged entirely or partially in an enclosed state, the second enclosed space being formed between the first enclosed space and the cover member,
the first enclosed space is formed to include a space on the opening part side, inside the cover member, and
the second enclosed space is formed to include a space on the closing part side, inside the cover member.

2. The encoder according to claim 1, wherein the second enclosed space is formed using the cover member and an enclosure member attached to the inside of the cover member.

3. The encoder according to claim 2, wherein the enclosure member includes an elastic body.

4. The encoder according to claim 2, wherein the enclosure member includes a member that causes ultraviolet rays to pass through.

5. The encoder according to claim 2, wherein the enclosure member includes a member that causes infrared rays to pass through.

6. The encoder according to claim 2, wherein the enclosure member and the cover member include a thermoplastic resin.

7. The encoder according to claim 2, wherein the enclosure member is a member that generates a reduced pressure state between the enclosure member and the cover member.

8. The encoder according to claim 1, wherein the second enclosed space is enclosed with gas having a higher heat-insulating effect than air.

* * * * *